United States Patent Office 2,950,298
Patented Aug. 23, 1960

2,950,298

STEROID SECONDARY 21-PHOSPHATE ESTERS

Joseph Elks, London, and Gordon Hanley Phillipps, Greenford, England, assignors to Glaxo Laboratories Limited, Greenford, England, a British company No Drawing. Filed Nov. 18, 1958, Ser. No. 774,580

Claims priority, application Great Britain Nov. 19, 1957

19 Claims. (Cl. 260—397.45)

This invention is concerned with improvements in or relating to steroid derivatives.

It has been shown that the 21-phosphate primary esters of cortical steroids such as cortisone, hydrocortisone, prednisone and prednisolone have valuable properties not possessed by the parent steroid or their 21-acetate and similar acyloxy derivatives. In particular, these 21-phosphate primary esters have the property of being water-soluble, thus enabling the steroid to be administered in aqueous solution.

It has now been found that new secondary 21-phosphates, and various salts thereof, of 20-keto steroid compounds of the pregnane and allopregnane series, having the following side-chain attached to the 17-carbon atom:

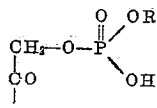

where R is an aliphatic or aromatic group, are not only soluble in water either in the form of their salts or in some cases as the free acid, but have the added and important property of being more stable in aqueous solution than the corresponding primary 21-phosphates or salts thereof. For brevity we use the term "compounds of the pregnane and allopregnane series" not only to designate compounds in which the ring systems are saturated but also to include compounds having ring unsaturation such as pregnenes, allopregnenes, pregnadienes, etc.

Moreover members of the new class of secondary phosphates according to the invention have not shown untoward toxicity or adverse physiological effects in test animals but have shown activity in the liver glycogen test when administered orally, subcutaneously, intraperitoneally or intravenously.

According to the present invention, therefore, there are provided as new compounds, steroids of the pregnane or allopregnane series having the following side-chain attached to the 17-carbon atom:

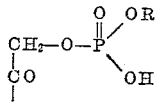

(where R is an aliphatic or aromatic group) and salts thereof in particular their alkali metal, alkaline earth metal and ammonium salts and salts with organic bases.

The new compounds according to the invention may have adreno-cortical or other physiological activity in themselves or they may represent precursors or intermediates of use in the synthesis of compounds having such activity.

A group of steroid derivatives according to the invention which are of particular interest are those having the general formula:

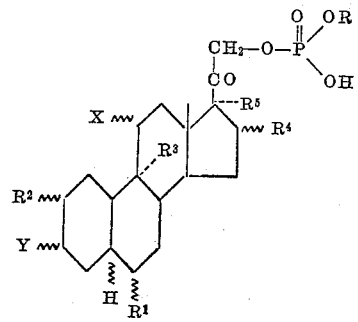

where R has the above mentioned meaning and $R^1$ is a hydrogen or halogen atom or an alkyl (e.g. methyl, ethyl, etc.) group;

$R^2$ is a hydrogen atom or an alkyl (e.g. methyl, ethyl, etc.) group;

$R^3$ is a hydrogen or a halogen atom;

$R^4$ is hydrogen or a hydroxy, acyloxy or alkyl group;

$R^5$ is a hydrogen or a hydroxy or acyloxy group;

X is a hydrogen atom or a hydroxy group or a ketonic oxygen atom, and

Y is a hydroxy or acyloxy group or a ketonic oxygen atom, and the corresponding $\Delta^1$, $\Delta^4$, $\Delta^{1:4}$ and $\Delta^{5(6)}$ compounds and salts of all such compounds, especially alkali metal, alkaline earth metal and ammonium salts and salts with organic bases.

The group R is preferably an unsubstituted or substituted alkyl (preferably containing from 1–6 carbon atoms), aryl (particularly phenyl), aralkyl (particularly benzyl) or phenacyl group. Substituents which may be included in such groups include hydroxy, halogen, e.g. chlorine or bromine, alkyl, alkoxy, e.g. methoxy, ethoxy, etc., nitro, cyano, amino, acylamino, carboxy and carbalkoxy groups. For example R may be a benzyl, hydroxyethyl, phenyl, methyl, ethyl, propyl, isopropyl, phenacyl, nitrobenzyl, nitrophenyl, methoxyphenyl, methoxyethyl, ethoxyethyl, methoxybenzyl, bromobenzyl, chlorobenzyl, cyanobenzyl, carbomethoxyphenyl or salicyl group. Those compounds according to the invention having an 11β-hydroxy group e.g. derivatives of hydrocortisone and prednisolone are of especial interest in that such compounds are particularly advantageously formulated in aqueous solution for administration.

By suitable choice of the nature of R one can obtain derivatives of varying water solubility. For example, compounds in which R is a hydroxyethyl group in general have relatively high solubility, especially as alkali metal salts, whereas compounds in which R is a phenyl group have comparatively low solubility even as alkali metal salts.

Examples of compounds according to the invention thus include particularly hydrocortisone and prednisolone 21-secondary orthophosphate esters, wherein the esterifying group (apart from the steroidal moiety) is a benzyl, hydroxyethyl, phenyl, methyl, ethyl, propyl, isopropyl, phenacyl, nitrobenzyl, nitrophenyl, methoxyphenyl, methoxyethyl, ethoxyethyl, methoxybenzyl, bromobenzyl, chlorobenzyl, cyanobenzyl, carbomethoxyphenyl or salicyl group. The substituents, if any, on phenyl and benzyl groups are preferably in the o- and/or p-positions.

Preferred salts of the compounds according to the invention include the sodium, potassium, magnesium, calcium, and ammonium salts.

It is of interest to note that various compounds according to the invention show particularly prolonged adrenocortical action as judged by animal experiments and examples of such compounds are the phenyl, nitrobenzyl, nitrophenyl and methoxyphenyl secondary esters of hydrocortisone and prednisolone.

The new compounds according to the invention can be formulated for administration together with a suitable carrier, in any desired way.

Preferred compositions are aqueous solutions for injection or topical application or solid preparation for oral or topical application e.g. tablets, capsules, ointments etc.

The new phosphate esters can be prepared from corresponding steroid tertiary phosphate esters having at $C_{17}$ the group:

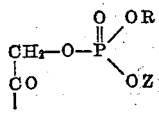

(where R has the above stated meaning and Z is a group which can be preferentially removed such as a benzyl or substituted benzyl or a phenacyl group or an electronegatively substituted phenyl group e.g. p-nitrophenyl group) by preferential removal of the group Z therefrom. Removal of the Z group may be for example conveniently effected by treatment with an organically soluble salt dissolved in an organic solvent; for this purpose we prefer to use a halide as the salt preferably an alkali metal or alkaline earth metal halide. Suitable salts include for example sodium iodide dissolved in acetone and lithium chloride dissolved in 2-ethoxyethanol. Other methods of selectively removing the Z group include hydrogenolysis, treatment with anhydrous tertiary amines, e.g. triethylamine, N-methylmorpholine, pyridine, etc. and selective hydrolysis. The best method of removal of the Z group does depend on its exact nature and suitable preliminary experiments will enable the best method to be selected in any given case.

It may be noted that the group R can be identical with the group Z and one such group can be selectively removed, without substantially affecting the other as demonstrated in the examples hereinafter.

The tertiary phosphate esters themselves may be prepared by reaction of the corresponding 21-halogeno or alkyl-, aralkyl- or aryl-sulphonyloxy steroid with a silver salt of the disubstituted phosphoric acid

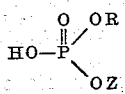

(where R is an alkyl, aryl or aralkyl group) or by alkylation or aralkylation of the steroid secondary phosphate

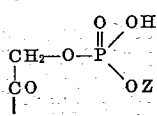

e.g. with an alkyl or aralkyl halide. The latter monobenzyl or substituted monobenzyl phosphate can be prepared from the corresponding dibenzyl or di(substituted benzyl) esters, e.g. by treatment with sodium iodide in acetone. Alternatively where the group R is to be the same as the group Z, the tertiary ester can be prepared by reacting the di-silver salt of the steroid primary phosphate with a halogen derivative of the group R— e.g. RCl.

A further method of making the new steroid derivatives is by the process described in the co-pending Application of Elks et al. Ser. No. 774,578 of even date. This process comprises reacting a steroid 21-halide or 21-alkyl-, aralkyl- or aryl-sulphonate with a phosphoric acid substituted with a group R, where R is as defined above, in the presence of an organic base, in solution in an inert solvent medium. By proceeding in this way one may obtain the desired steroid secondary phosphate ester in good yield. It should also be noted that the process of the said co-pending application can also be used to prepare tertiary phosphate esters from which one esterifying group can be selectively removed as described above.

In order that the invention may be well understood the following examples are given by way of illustration only:

EXAMPLE 1

(a) *Hydrocortisone 21-dibenzyl phosphate*

$11\beta$:$17\alpha$ - dihydroxy - 21 - iodopregn - 4 - ene - 3:20-dione (7.2 g.) and finely ground silver dibenzyl phosphate (10.8 g.) were refluxed for 16 hr. in benzene (700 ml.). The silver salts were filtered off, using kieselguhr, and re-extracted with boiling benzene. The combined filtrate was concentrated to ca. 500 ml. Hydrocortisone dibenzyl phosphate (6.34 g.) M.P. 182–183° C., $[\alpha]_D^{20}+106°$ (C., 0.5 in $CHCl_3$) separated as fibrous needles. A second crop (0.7 g.) M.P. 169–172° C. obtained after charcoal treatment, was recrystallised from ethyl acetate to give 0.37 g. M.P. 175–178° C.

Further crystallisation from ethyl acetate gave fine white needles, M.P. 188.5–189.5° C., λ max. (in EtOH) 241.5 mμ, $E_{1\ cm.}^{1\%}$ 271

(Found: C, 67.1; H, 7.0; P, 4.7. $C_{35}H_{43}O_8P$ requires C, 67.5; H, 7.0; P, 5.0%).

(b) *Hydrocortisone 21-sodium benzyl phosphate*

Hydrocortisone 21-dibenzyl phosphate (16 g.) and dry sodium iodide (16 g.) were refluxed for 6 hr. in acetone (1600 ml.). The sodium salt began to separate after 20 mins., when a seed crystal was added. After standing overnight at room temperature the product was filtered off, washed with acetone and dried at 100° C./0.1 mm. for 1 hr. The hydrocortisone 21-sodium benzyl phosphate (11.9 g.; 84.5%) had M.P. 224–226° C., $[\alpha]_D^{20}+120.5°$ (C., 2.0 in water) λmax. (Aq.NaHCO₃) 247.5 mμ, $E_{1\ cm.}^{1\%}$ 299

(Found: C, 60.3; H, 6.6; P, 5.8. $C_{28}H_{36}O_8PNa$ requires C, 60.6; H, 6.55; P, 5.6%).

(c) *Hydrocortisone 21-cyclohexylammonium benzyl phosphate*

A solution of cyclohexylamine hydrochloride (0.61 g.) in water (5 ml.) was added slowly to a solution of hydrocortisone 21-sodium benzyl phosphate (0.61 g.) in water, and the crystalline precipitate (0.71 g.), M.P. 217–220° C. (dec.), was collected and recrystallised from 50% aqueous alcohol (20 ml.) to give hydrocortisone 21-cyclohexylammonium benzyl phosphate, which after drying at 90°/0.1 mm./3 hr. had M.P. 225–230° C. (dec.).

(Found: C, 60.3; H, 8.8; N, 2.1; P, 4.6. $C_{34}H_{50}O_8NP.2H_2O$ requires C, 61.1; H, 8.15; N, 2.1; P, 4.6%), λmax. (in EtoH) 241 mμ, $E_{1\ cm.}^{1\%}$ 254

(d) *Hydrocortisone 21-benzyl hydrogen phosphate*

Hydrocortisone 21-sodium benzyl phosphate (0.5 g.) in water (10 ml.) was acidified with 2 N hydrochloric acid (2 ml.). The initially gummy deposit was filtered after 18 hr. at 0° C., and recrystallised from isopropyl ether-acetone on addition of hexane to give hydrocortisone 21-benzyl hydrogen phosphate with M.P. 161–163° C. (frothing).

(Found: C, 63.6; H, 7.0; P, 6.1; $C_{28}H_{37}O_8P$ requires C, 63.1; H, 7.2; P, 5.8%), λmax. (in aq. NaHCO₃) 248 mμ, $E_{1\ cm.}^{1\%}$ 313

(e) Hydrocortisone 21-silver benzyl phosphate

A hot solution of silver nitrate (0.25 g.) in water (5 ml.) was added slowly to a hot solution of hydrocortisone 21-sodium benzyl phosphate (0.5 g.) in water (5 ml.). The suspension of white crystals was cooled overnight, and the light-sensitive silver salt collected and washed with water and dried. The crude product (ca. 0.5 g.), M.P. 163–166° C. was recrystallised from aqueous alcohol to give hydrocortisone 21-silver benzyl phosphate (0.143 g.) M.P. 163–165° C., after drying over phosphorus pentoxide.

(Found: C, 51.1; H, 6.0; P, 5.1; Ag., 16.1, $C_{28}H_{36}O_8PAg.H_2O$ requires C, 51.1; H, 5.8; P, 4.7; Ag., 16.4%) λmax. (aqueous EtOH) 245.5 mμ, $E_{1 cm.}^{1\%}$ 261

EXAMPLE 2

(a) Hydrocortisone 21-benzyl (2-hydroxyethyl)phosphate

A solution of hydrocortisone 21-sodium benzyl phosphate (0.5 g.) in water (4 ml.) was acidified with 2 N hydrochloric acid (4 ml.) and extracted with ethyl acetate (5 x 3 ml.). The ethyl acetate extract was washed with water, and dried over magnesium sulphate. The dried solution (20 ml.) was treated for 3 days at room temperature with ethylene oxide (3 ml.) in a stoppered flask. The neutral solution was concentrated in vacuo to leave an oily residue (483 mg.) which crystallised on standing. Crystallisation from ethyl acetate (20 ml.) gave hydrocortisone 21-benzyl (2-hydroxyethyl)phosphate (287 mg.) M.P. 145–147° C. λmax. (in ethanol) 241.5 mμ, $E_{1 cm.}^{1\%}$ 274

(Found: C, 61.7; H, 7.4; P, 5.4. $C_{30}H_{41}O_9P$ requires C, 62.5; H, 7.2; P, 5.4%).

(b) Hydrocortisone 21-sodium (2-hydroxyethyl)phosphate

Crude hydrocortisone 21-benzyl(2-hydroxyethyl)phosphate obtained from hydrocortisone 21-sodium benzyl phosphate (3 g.) was boiled under reflux for 5 hr. in acetone (150 ml.) with sodium iodide (3 g.). After 16 hr. at room temperature the separated sodium salt was collected by filtration and washed with acetone. This hygroscopic salt was dissolved in absolute ethanol (30 ml.) and precipitated by addition of acetone (300 ml.), to give hydrocortisone 21-sodium (2-hydroxyethyl)phosphate as a white hygroscopic solid, (1.65 g.), λmax. (in $H_2O$) 247 mμ, $E_{1 cm.}^{1\%}$ 293

(Found: C, 48.6; H, 7.75; P, 5.4%. $C_{23}H_{34}O_9PNa_2.3H_2O$ requires C, 49.1; H, 7.2; P, 5.5%).

EXAMPLE 3

(a) Hydrocortisone 21-benzyl phenyl phosphate

11β:17α-dihydroxy-21-iodopregn-4-ene-3:20-dione (5.2 g.) and benzyl phenyl silver phosphate (5.2 g.) were refluxed in acetonitrile (200 ml.) for 3 hours. The solvent was then evaporated off and the residue extracted with ethyl acetate. The extract was boiled with charcoal, filtered, and evaporated to small bulk. Cooling yielded crystals of hydrocortisone 21-benzyl phenyl phosphate (4.0 g.), M.P. 163–165° C. A further crystallisation from ethyl acetate gave needles of the monohydrate M.P. 173–175° C., $[\alpha]_D^{20}+118°$ (C., 0.3; chloroform).

(Found: C, 64.85; H, 6.9; P, 4.4. $C_{34}H_{41}O_8P.H_2O$ requires C, 65.1; H, 6.9; P, 4.9%.)

(b) Hydrocortisone 21-sodium phenyl phosphate

Hydrocortisone 21-benzyl phenyl phosphate (3 g.) and sodium iodide (3 g.) were refluxed in acetone (300 ml.) for 12 hours. The precipitated hydrocortisone 21-sodium phenyl phosphate was filtered off, washed with acetone, and dried. Yield 1.5 g., M.P. 224–226° C. Crystallisation from water/acetone gave hydrocortisone 21-sodium phenyl phosphate as a hydrate M.P. 210–211° C., $[\alpha]_D^{20}+113°$ (C., 0.5; water).

(Found: C, 57.2; H, 6.6; P, 6.1. $C_{27}H_{34}O_8PNa.1.5H_2O$ requires C, 57.1; H, 6.6; P, 5.5%.)

EXAMPLE 4

(a) Hydrocortisone 21-benzyl ethyl phosphate

Hydrocortisone 21-silver benzyl phosphate (3 g.) was suspended in acetonitrile (100 ml.) containing ethyl iodide (10 ml.), and the mixture was refluxed for 3 hours and then allowed to stand for a further 12 hours. The solvent was then evaporated off and the residue extracted with ethyl acetate. The extract was washed successively with dilute aqueous sodium bisulphite, 1% sodium bicarbonate solution and water. Evaporation of the ethyl acetate extract (dried over $MgSO_4$) yielded hydrocortisone 21-benzyl ethyl phosphate (2.3 g.), M.P. 97–99° C., which after crystallisation from ethyl acetate had M.P. 155–163° C.

(b) Hydrocortisone 21-sodium ethyl phosphate

Hydrocortisone 21-benzyl ethyl phosphate (2 g.) and sodium iodide (2 g.) were refluxed in acetone (200 ml.) for 17 hours. The precipitated hydrocortisone 21-sodium ethyl phosphate was filtered off, washed with acetone, and dried. Yield 1.2 g., M.P. 194–197° C., $[\alpha]_D^{20}+122°$ (c., 0.45, water). Crystallisation from aqueous acetone gave a hydrate, M.P. 190–192°, $[\alpha]_D^{20}+124°$ C.

(Found: C, 53.0; H, 7.2; P, 6.5%. $C_{23}H_{34}O_8PNa.1.5H_2O$ requires C, 53.2; H, 7.2; P, 6.0%.)

EXAMPLE 5

(a) Hydrocortisone 21-benzyl isopropyl phosphate

Hydrocortisone 21-silver benzyl phosphate (2 g.) was suspended in acetonitrile (60 ml.) containing isopropyl iodide (7 ml.), refluxed for 3 hours and then allowed to stand for 1 hour. The solvent was evaporated off and the residue extracted with ethyl acetate. The extract was washed successively with dilute aqueous sodium bisulphite, 1% sodium bicarbonate solution, and water. Evaporation of the ethyl acetate extract (dried over $MgSO_4$) yielded hydrocortisone 21 - benzyl isopropyl phosphate (0.85 g.)

(b) Hydrocortisone 21-sodium isopropyl phosphate

Hydrocortisone 21-benzyl isopropyl phosphate (0.85 g.) and sodium iodide (0.85 g.) were refluxed in acetone (75 ml.) for 9.5 hours. The precipitated hydrocortisone 21-sodium isopropyl phosphate was filtered off, washed with acetone and dried. Yield 0.22 g., M.P. 191–194° C., $[\alpha]_D^{20}+108°$ (c., 2; water).

EXAMPLE 6

(a) Prednisolone 21-benzyl phenyl phosphate

A suspension of silver benzyl phenyl phosphate (23.9 g.) and 11β:17α-dihydroxy-21-iodopregna-1:4-diene-3:20-dione (19 g.) in acetonitrile (1 litre) was boiled under reflux for 1 hr. The solid was filtered off and washed with hot chloroform, and the combined filtrates were evaporated to dryness in vacuo. The residue was dissolved in chloroform and the solution was washed with dilute nitric acid, aqueous sodium carbonate, and water. Removal of solvent from the dried solution in vacuo left the crude triester (23.7 g.; 97%), which crystallised from aqueous acetone as needles, M.P. 194–197° C.

(b) Prednisolone 21-cyclohexylammonium phenyl phosphate

Prednisolone 21-benzyl phenyl phosphate (0.5 g.) and sodium iodide (1.0 g.) were boiled under reflux for 3 hr. in acetone (50 ml.) and the solvent was then removed in vacuo. The residue was shaken with water (50 ml.) and ether (30 ml.), and the aqueous layer washed three times with ether. The dissolved ether was boiled out of the aqueous phase, and cyclohexylamine hydrochloride (0.5 g.) was added to the hot solution to give a crystalline precipitate of prednisolone 21-cyclohexylammonium phenyl phosphate (0.311 g.), M.P. 221° C. (dec.). Crystallisation from aqueous ethanol gave a sample M.P. 222° C. (dec.).

(Found: C, 64.3; H, 7.9; N, 2.1; P, 5.3. $C_{33}H_{46}O_8NP$ requires C, 64.4; H, 7.5; N, 2.3; P, 5.0%), λmax. (in EtOH) 242.5 mμ, $E^{1\%}_{1cm.}$ 244

(c) *Prednisolone 21-cyclohexylammonium phenyl phosphate*

Prednisolone 21-benzyl phenyl phosphate (100 mg.) and cyclohexylammonium iodide (100 mg.) were boiled under reflux for 4 hr. in acetone (10 ml.). The precipitated crystalline cyclohexylammonium salt (56 mg.), M.P. 221° C. (dec.) was collected by filtration and washed with acetone.

(d) *Prednisolone 21-sodium phenyl phosphate*

Prednisolone 21-benzyl phenyl phosphate (1.0 g.) and sodium iodide (1.0 g.) were boiled under reflux for 20 hr. in acetone (100 ml.). After partial removal of the solvent under reduced pressure the precipitated sodium salt was filtered off and on recrystallisation from methanol methyl ethyl ketone gave prednisolone 21-sodium phenyl phosphate as a microcrystalline dihydrate (0.5 g.) M.P. 214–216° C., $[\alpha]_D^{20}+88°$.

(Found: C, 56.2; H, 6.4; P, 5.7. $C_{27}H_{32}O_8PNa.2H_2O$ requires C, 56.4; H, 6.3; P, 5.4%), λmax. (in $H_2O$) 247 mμ, $E^{1\%}_{1cm.}$ 270

(e) *Prednisolone 21-sodium phenyl phosphate*

Prednisolone 21 - cyclohexylammonium phosphate (10.46 g.) in 2:1 ethanol-water was passed through a column of an excess of Zeo-Karb 225 ($H^+$ form), and elution continued until the eluate was no longer acidic. The eluate was concentrated, titrated with sodium hydroxide to the equivalence point, and then evaporated to dryness. The residue was dissolved in ethanol and reprecipitated with acetone, to give prednisolone 21-sodium phenyl phosphate (8 g.) as a white powder, M.P. 195–197° C., $[\alpha]_D^{20}+94°$.

(Found: C, 54.6; H, 6.8; P, 5.0. $C_{27}H_{32}O_8PNa.3H_2O$ requires C, 54.7; H, 6.7; P, 5.2%).

EXAMPLE 7

(a) *Prednisolone 21-dibenzyl phosphate*

11β:17α-dihydroxy-21-iodopregna-1:4-diene-3:20-dione (6.0 g.) and silver dibenzyl phosphate (6.0 g.) were boiled under reflux for 2.5 hr. in acetonitrile (250 ml.). The solvent was removed under reduced pressure, and the residue extracted with boiling ethyl acetate. Concentration of the extract to ca. 200 ml. gave prednisolone 21-dibenzyl phosphate (3.98 g.) M.P. 193–194° C., $[\alpha]_D^{20}+83.5°$ (c., 0.9 in $CHCl_3$).

(Found: C, 68.3; H, 6.9; P, 5.3. $C_{35}H_{41}O_8P$ requires C, 67.7; H, 6.7; P, 5.0%), λmax. (in EtOH) 243 mμ, $E^{1\%}_{1cm.}$ 253.5

(b) *Prednisolone 21-sodium benzyl phosphate*

Prednisolone 21-dibenzyl phosphate (3.0 g.) and sodium iodide (3.0 g.) were boiled under reflux for 6 hr. in acetone (300 ml.). The precipitated sodium salt (2.49 g.) was filtered from the cooled suspension, and on recrystallisation from aqueous acetone gave prednisolone 21-sodium benzyl phosphate as a hydrate (1.9 g.), M.P. 236–238° C., $[\alpha]_D^{20}+88°$ (c., 0.66 in $H_2O$).

(Found: C, 58.7; H, 6.5; P, 5.9. $C_{28}H_{34}O_8PNa.H_2O$ requires C, 58.9; H, 6.4; P, 5.4%), λmax. (in $H_2O$) 246.5 mμ, $E^{1\%}_{1cm.}$ 277

(c) *Prednisolone 21-benzyl hydrogen phosphate*

The sodium salt (1.0 g.) in water (5 ml.), was acidified with 2 N-hydrochloric acid (5 ml.), and the resulting suspension extracted with ethyl acetate (10 ml., then 5 x 5 ml.) and the extract washed with a little water. The combined extracts were dried for 30 mins. over magnesium sulphate and the drying agent removed by filtration. Prednisolone 21-benzyl hydrogen phosphate was obtained as a solid, M.P. 135–136° C., by removal of solvent and evaporation of a solution of the residue in ether. The solid analysed as a hemihydrate (Found: C, 62.6; H, 7.15; P, 5.5. $C_{28}H_{35}O_8P.\frac{1}{2}H_2O$ requires C, 62.3; H, 6.7; P, 5.7%).

EXAMPLE 8

(a) *Prednisolone 21-disilver phosphate*

A hot solution of prednisolone disodium phosphate (3.0 g.) in methanol (100 ml.) was mixed with a hot solution of silver nitrate (1.2 g.) in methanol (100 ml.). The suspension was kept at room temperature for 1 hr. in the dark, and the disilver salt (2.77 g.) was collected by filtration, washed with methanol and dried at 0.1 mm.

(Found: C, 39.0; H, 4.9; P, 4.8; Ag, 33.8.

$C_{21}H_{27}O_8PAg_2$ requires C, 38.5; H, 4.1; P, 4.7; Ag, 33.0%).

(b) *Prednisolone 21-diphenacyl phosphate*

Prednisolone 21-disilver phosphate (0.5 g.) was boiled under reflux for 8 hr. with phenacyl bromide (0.4 g.) in dry acetonitrile (50 ml.). The solvent was then removed under reduced pressure and the residue extracted with ethyl acetate (3×100 ml.). The extract was washed with sodium bicarbonate solution and dried. Removal of the solvent left an oil, which crystallised on addition of benzene to yield crude prednisolone 21-diphenacyl phosphate (0.24 g.) M.P. 175° C. Recrystallisation from benzene furnished the pure sample, M.P. 180–181° C., $[\alpha]_D^{20}+92.8°$ (c., 0.97 in EtOH).

(Found: C, 65.5; H, 6.8; P, 5.1. $C_{37}H_{41}O_{10}P$ requires C, 65.7; H, 6.1; P, 4.6%), λmax. (in EtOH) 242 mμ.

$E^{1\%}_{1cm.}$ 602

(c) *Prednisolone 21-sodium phenacyl phosphate*

Prednisolone 21-diphenacyl phosphate (1.0 g.) was dissolved in acetone (100 ml.) and boiled under reflux with sodium iodide (1 g.). After 1 hour the reaction was complete and the prednisolone 21-sodium phenacyl phosphate (0.716 g.) was collected by filtration, washed with acetone, and dried at 60° C./0.1 mm. Recrystallisation from aqueous acetone gave the analytical sample of indefinite melting point. $[\alpha]_D^{20}+90°$ (c., 1.0 in $H_2O$).

(Found: C, 57.1; H, 6.5; P, 5.6. $C_{29}H_{34}O_9PNa$. 1.5 $H_2O$ requires C, 57.3; H, 6.1; P, 5.1%), λmax. (in $H_2O$) 246.5 mμ

$E^{1\%}_{1cm.}$ 453

EXAMPLE 9

(a) *Hydrocortisone 21-di-p-nitrobenzyl phosphate*

11β:17α - dihydroxy - 21 - iodopregn - 4 - ene - 3:20-dione (10 g.) and silver di-p-nitrobenzyl phosphate (10 g.) were boiled under reflux in acetonitrile (300 ml.) for 3 hr. After removal of the solvent in vacuo, the residue was extracted with boiling ethyl acetate (3×200 ml.) and the extract filtered through kieselguhr. The filtrate was concentrated to 500 ml. and allowed to cool yielding hydrocortisone 21-di-p-nitrobenzyl phosphate (8.1 g.). Second and third crops brought the total yield to 8.64 g. after drying at 90° C./0.1 mm. for 2 hr. Recrystallisation from ethyl acetate gave hydrocortisone 21-di-p-nitrobenzyl phosphate, M.P. 195–198° C., $[\alpha]_D^{20}+100°$ (c., 1.0 in $CHCl_3$).

(Found: C, 58.5; H, 5.5; N, 3.9; P, 4.3%.

$C_{35}H_{41}O_{12}N_2P$ requires C, 59.0; H, 5.8; N, 3.9; P, 4.35), $\lambda$max. (in ethanol) 248.5 m$\mu$ $E^{1\%}_{1cm.}$ 406

*(b) Hydrocortisone 21-sodium p-nitrobenzyl phosphate*

Hydrocortisone 21-di-p-nitrobenzyl phosphate (2.5 g.) and sodium iodide (2.5 g.) were boiled under reflux for 6 hr. in acetonitrile (100 ml.). The mixture was cooled and filtered and the insoluble sodium salt washed with acetonitrile. After drying at 60° C./0.1 mm. for 1 hr. the crude hydrocortisone p-nitrobenzyl sodium phosphate (1.89 g.; 90.1%) was recrystallised from aqueous acetone to give the pure material, M.P. 217–219° C. (dec.) $[\alpha]_D^{20}+94.8°$ (c., 1.15 in $H_2O$).

(Found: C, 54.9; H, 6.8; N, 2.3; P, 5.4. $C_{28}H_{35}O_{10}NPNa.H_2O$ requires C, 54.6; H, 6.2; N, 2.3; P, 5.0%), $\lambda$max. (in $H_2O$) 251 m$\mu$ $E^{1\%}_{1cm.}$ 323

*(c) Hydrocortisone 21-cyclohexylammonium p-nitrobenzyl phosphate*

Hydrocortisone 21-di-p-nitrobenzyl phosphate (2.0 g.) and sodium iodide (2.0 g.) were boiled under reflux in acetone (200 ml.) for 5 hr. Since no separation of sodium salt occurred the solvent was completely removed in vacuo and water (20 ml.) and ethyl acetate (50 ml.) were added. The ethyl acetate layer was washed twice with water and the combined aqueous layers washed with ethyl acetate. Traces of dissolved ethyl acetate were removed from the aqueous layer in vacuo, and cyclohexylamine hydrochloride (2.5 g.) was added. The precipitated gum crystallised on heating, and after cooling to 0° C. overnight the hydrocortisone 21-cyclohexylammonium p-nitrobenzyl phosphate (1.715 g.) M.P. 210° C. (dec.) was collected by filtration and dried at 100° C./0.1 mm. Recrystallisation from aqueous methanol gave the analytical sample; M.P. 210–211° C.

(Found: C, 59.9; H, 7.55; N, 4.0; P, 4.2. $C_{34}H_{49}O_{10}N_2P$ requires C, 60.3; H, 7.3; N, 4.15; P, 4.6%), $\lambda$max. (in EtOH) 244 m$\mu$ $E^{1\%}_{1cm.}$ 308

$\lambda$ shoulder 270 m$\mu$ $E^{1\%}_{1cm.}$ 176.5

EXAMPLE 10

*(a) Prednisolone 21-di-p-nitrobenzyl phosphate*

11$\beta$:17$\alpha$ - dihydroxy - 21 - iodopregna - 1:4 - diene-3:20-dione (10 g.) was heated under reflux with silver di-p-nitrobenzyl phosphate (10 g.) in acetonitrile (500 ml.) for 6.5 hr. The solvent was removed under reduced pressure and the residue extracted with boiling ethyl acetate (6×500 ml..), the extract being filtered through kieselguhr. After concentration to 200 ml. prednisolone 21-di-p-nitrobenzyl phosphate crystallised (7.3 g. M.P. 205–208° C.). Recrystallisation from alcohol gave the pure sample M.P. 216° C., $[\alpha]_D^{20}+89.5$ (c., 1.24 in $CHCl_3$).

(Found: C, 59.4; H, 5.8; N, 3.7; P, 4.5. $C_{35}H_{39}O_{12}N_2P$ requires C, 59.2; H, 5.5; N, 3.9; P, 4.4%), $\lambda$max. (ethanol), 255.5 m$\mu$ $E^{1\%}_{1cm.}$ 483

*(b) Prednisolone 21-sodium p-nitrobenzyl phosphate*

Prednisolone 21-di-p-nitrobenzyl phosphate (5 g.) was boiled under reflux with sodium iodide (5 g.) in acetonitrile (500 ml.) for 5.5 hr. The mixture was cooled and the sodium salt (3.7 g.) collected by filtration, washed with acetonitrile and dried at 60° C./0.1 mm. Recrystallisation from aqueous acetone gave the prednisolone 21-sodium p-nitrobenzyl phosphate (2.25 g.), M.P. 218–221° C., $[\alpha]_D^{20}+72.5°$, (c., 2.95 in $H_2O$).

(Found: C, 54.8; H, 6.0; N, 2.3; P, 5.6.

$C_{28}H_{33}O_{10}NPNa.H_2O$ requires C, 54.7; H, 5.7; N, 2.3; P, 5.0%), $\lambda$max. ($H_2O$) 259.5 m$\mu$ $E^{1\%}_{1cm.}$ 336

*(c) Prednisolone 21-cyclohexylammonium p-nitrophenyl phosphate*

1.9 N aqueous lithium hydroxide (0.77 ml.) was added during 1 min. to a stirred suspension of prednisolone 21-di-p-nitrophenyl phosphate (0.5 g.) in dioxan (5 ml.), and water (1.5 ml.) was then added. After 1 hr. the reaction mixture became homogeneous, and after 2 hr. an equal volume of water was added and the solution was adjusted to pH 4 by addition of Zeokarb 225 (H+ form). The dioxan was removed in vacuo from the solution, and the aqueous residue was extracted with ether until the extracts no longer contained p-nitrophenol. The aqueous layer was treated with cyclohexylamine hydrochloride (1.0 g.), and the resultant suspension was extracted with ethyl acetate (30 ml.; 10 ml.; 5 ml.). The extract was washed with a little water, and on concentration of the wet ethyl acetate solution prednisolone 21-cyclohexylammonium p-nitrophenyl phosphate separated as crystals (131 mg.), M.P. 198° C., $\lambda$max. (in EtOH) 242 m$\mu$ $E^{1\%}_{1cm.}$ 253

EXAMPLE 11

*(a) Prednisolone 21-di-p-bromobenzyl phosphate*

11$\beta$:17$\alpha$-dihydroxy-21-iodopregna-1:4-diene-3:20-dione (1.0 g) was dissolved in acetonitrile (100 ml.) and heated under reflux for 28 hr. with silver di-p-bromobenzyl phosphate (1.25 g.). The hot solution was filtered through kieselguhr and concentrated to half-bulk. The prednisolone 21-di-p-bromobenzyl phosphate (0.81 g.) which separated on cooling was recrystallised from alcohol to give the pure material, M.P. 186–187° C., $[\alpha]_D^{20}+80.5°$ (c., 1.18 in EtOH).

(Found: C, 54.4; H, 5.1; Br, 20.7; P, 3.6%.

$C_{35}H_{39}O_8PBr_2$ requires C, 54.0; H, 5.0; Br, 20.5; P, 4.0%), $\lambda$max. (in EtOH) 227 m$\mu$, $E^{1\%}_{1cm.}$ 448

238.5 m$\mu$, $E^{1\%}_{1cm.}$ 238

*(b) Prednisolone 21-di-p-bromobenzyl phosphate*

Prednisolone 21-disilver phosphate (2 g.) was boiled under reflux with p-bromobenzyl bromide (1.7 g.) in acetonitrile (100 ml.) for 24 hr. The acetonitrile was removed under reduced pressure and the residue extracted with boiling ethyl acetate (5×100 ml.). After filtration through kieselguhr the extract was concentrated to dryness in vacuo. After washing with petroleum ether (B.P. 40–60° C.) the crude prednisolone 21-di-p-bromobenzyl phosphate was obtained as a powder (1.23 g.). It was recrystallised from alcohol as in *(a)*.

*(c) Prednisolone 21-sodium p-bromobenzyl phosphate*

Prednisolone 21-di-p-bromobenzyl phosphate (2.5 g.) was dissolved in acetone (250 ml.) and boiled under reflux with sodium iodide (2.5 g.). After 4 hr. the mixture was cooled and the sodium salt (1.82 g.; 89.8%) collected by filtration, washed with acetone and dried at 60° C./0.1 mm. for 1 hr. Recrystallisation from aqueous acetone gave the pure material (1.125 g.), M.P. 243° C. (dec.), $[\alpha]_D^{20}+75.6°$ (c., 0.82 in EtOH).

Found: C, 51.8; H, 5.5; Br, 12.2; P, 5.1%.

$C_{28}H_{33}O_8BrPNa.H_2O$ requires C, 51.8; H, 5.4; Br, 12.3; P, 4.8%), $\lambda$max. (in $H_2O$), 244.5 m$\mu$, $E^{1\%}_{1cm.}$ 261 and 228 m$\mu$, $E^{1\%}_{1cm.}$ 314

EXAMPLE 12

(a) Dibenzyl o-methoxyphenyl phosphate

An ice-cold solution of dibenzyl phosphorochloridate (ca. 8.5 g.) in carbon tetrachloride (80 ml.) was added to dry powdered potassium o-methoxyphenate (5.1 g.), cooled in an ice-bath, during 10 min. The mixture was stirred at 0° for 6 hours and then left overnight. The mixture was shaken with aqueous sodium carbonate and water, and dried over magnesium sulphate. Removal of solvent, finally at 100° C./0.5 mm., left crude dibenzyl o-methoxyphenyl phosphate as a yellow oil (10.2 g.).

(b) Sodium benzyl o-methoxyphenyl phosphate

Crude dibenzyl o-methoxyphenyl phosphate (10.2 g.) in acetone (100 ml.) was heated under reflux with sodium iodide (5 g.) for 1 hour. A solid separated out, and this was filtered off, washed with acetone, and dried (6.8 g.). A portion of the solid was dissolved in water and precipitated with acetone. The precipitate was filtered, washed with acetone and dried, and yielded sodium benzyl o-methoxyphenyl phosphate as a white powder M.P. 260° C.

(Found: P, 9.6. $C_{14}H_{14}O_5PNa$ requires P, 9.8%).

(c) Silver benzyl o-methoxyphenyl phosphate

Crude sodium benzyl o-methoxyphenyl phosphate (5 g.) was dissolved in a small quantity of water and a solution of silver nitrate (2.8 g.) in water was added. There was an immediate precipitation of the silver salt, which was filtered off and washed with a small quantity of water, and dried (6 g.). A portion was crystallised from water to give silver benzyl o-methoxyphenyl phosphate as needles, M.P. 165–166° C.

(Found: C, 40.1; H, 3.6. $C_{14}H_{14}O_5PAg.H_2O$ requires C, 40.1; H, 3.8%).

(d) Prednisolone 21-benzyl o-methoxyphenyl phosphate

Silver benzyl o-methoxyphenyl phosphate (5 g.) in acetonitrile (250 ml.) was heated under reflux with 11β:17α - dihydroxy - 21 - iodopregna - 1:4 - diene - 3:20-dione (5 g.) for 1 hr. The solution was then evaporated to dryness, and the residue was extracted with chloroform. The chloroform solution was washed with 2 N nitric acid, 2 N sodium carbonate, water, filtered and dried ($MgSO_4$). Evaporation under reduced pressure gave the crude triester (6.6 g.). A portion of the solid was boiled with ethanol (charcoal) and the residue obtained after filtration and evaporation of the solvent was crystallised from aqueous acetone to give prednisolone 21-benzyl o-methoxyphenyl phosphate as needles, M.P. 135° C., $[\alpha]_D^{20}+75°$ ($CHCl_3$).

(Found: P, 4.3. $C_{35}H_{41}O_9P$ requires P, 4.9%), λmax. (in EtOH) 242 mμ, $E_{1cm}^{1\%}$ 229

(e) Prednisolone 21-sodium o-methoxyphenyl phosphate

Crude prednisolone 21-benzyl o-methoxyphenyl phosphate (4.38 g.) was heated under reflux for 2.5 hr. in acetone (250 ml.) containing sodium iodide (4.5 g.) and was then allowed to stand at room temperature overnight. The precipitated product (1.21 g.), M.P. 185–195° C., was filtered off, washed with acetone, and dried. Crystallisation from methanol-methyl ethyl ketone-benzene gave prednisolone 21-sodium o-methoxyphenyl phosphate as a dihydrate, M.P. 194–196° C., $[\alpha]_D^{20}+84.3°$.

(Found: C, 55.0; H, 6.5; P, 5.55. $C_{28}H_{34}O_9PNa.2H_2O$ requires C, 55.6; H, 6.3; P, 5.1%), λmax. 246. mμ, $E_{1cm}^{1\%}$ 256

λmin. 229.5 mμ, $E_{1cm}^{1\%}$ 188

EXAMPLE 13

(a) Dibenzyl p-methoxyphenyl phosphate

Potassium p-methoxyphenate (10.2 g.) was condensed with dibenzyl phosphorochloridate (ca. 17 g.) in the way described for the o-methoxy compound in Example 12(a), to give the triester (19.85) g.) as a yellow oil.

(b) Sodium benzyl p-methoxyphenyl phosphate

Crude dibenzyl p-methoxyphenyl phosphate (19.85 g.), was heated under reflux in acetone (200 ml.) containing sodium iodide (10 g.) for 3 hr. After standing at room temperature overnight, isolation as described for the o-methoxy compound in Example 12(b) yielded sodium benzyl p-methoxyphenyl phosphate as a white powder (11.12 g.) M.P. 240° C. (dec.).

(Found: P, 9.1. $C_{14}H_{14}O_5PNa.H_2O$ requires P, 9.3).

(c) Silver benzyl p-methoxyphenyl phosphate

Silver nitrate (6 g.) in water was added to an aqueous solution of sodium benzyl p-methoxyphenyl phosphate (10.88 g.). The white precipitate was filtered off, washed with a small quantity of water and dried. Crystallisation of this solid from water gave silver benzyl p-methoxyphenyl phosphate as needles, M.P. 166–167° C.

(Found: C, 42.2; H, 3.5. $C_{14}H_{14}O_5PAg$ requires C, 41.9; H, 3.5%).

(d) Prednisolone 21-benzyl p-methoxyphenyl phosphate

Silver benzyl p-methoxyphenyl phosphate (7 g.) in dioxan (350 ml.) containing 11β:17α-dihydroxy-21-iodopregna-1:4-diene-3:20-dione (7 g.) was heated at 70° C. for 2 hours. The solution became brown and silver iodide was precipitated. After distillation of the solvent the residue was extracted with chloroform and the extract was washed with 2 N nitric acid, aqueous sodium carbonate and water, then filtered and dried ($MgSO_4$). The solvent was removed in vacuo leaving a yellow solid (7.8 g.). Crystallisation from aqueous acetone gave prednisolone 21-benzyl p-methoxyphenyl phosphate (4.24 g.) as hydrated needles, M.P. 167–169° C., $[\alpha]_D^{20}+82°$ (in $CHCl_3$).

(Found: C, 64.7; H, 6.8; P, 4.6. $C_{35}H_{41}O_9P.H_2O$ requires C, 64.2; H, 6.6; P, 4.7%).

(e) Prednisolone 21-cyclohexylammonium p-methoxyphenyl phosphate

Prednisolone 21-benzyl p-methoxyphenyl phosphate (3.0 g.) and sodium iodide (3.0 g.) were boiled under reflux for 3 hr. in acetone (150 ml.). The mixture was allowed to stand for a day at room temperature, and the crude sodium salt (1.8 g.), M.P. 191–197° C. was filtered off and washed with acetone.

A solution of crude sodium salt (1.5 g.) in water (20 ml.) was heated to ca. 80° C. and a solution of cyclohexylamine hydrochloride (1.5 g.) in water (10 ml.) was added. The crystalline product (1.22 g.) was filtered from the cooled suspension, and on recrystallisation from aqueous ethanol gave prednisolone 21-cyclohexylammonium p-methoxyphenyl phosphate (0.94 g.), M.P. 224–226° C. (dec.).

(Found: C, 63.0; H, 7.9; N, 1.95; P, 5.0. $C_{34}H_{48}O_9NP$ requires C, 63.2; H, 7.5; N, 2.2; P, 4.8%), λmax. (in EtOH) 242 mμ.

$E_{1cm}^{1\%}$ 242

225 mμ, $E_{1cm}^{1\%}$ 277

(f) Prednisolone 21-sodium p-methoxyphenyl phosphate

Prednisolone 21 - cyclohexylammonium p-methoxyphenyl phosphate (742 mg.) in ethanol (16 ml.) and water (4 ml.) was passed through a column of an excess of Zeo-Karb 225 ($H^+$ form), and elution with aqueous alcohol was continued until the eluate was no longer acidic. The eluate was titrated to the equivalence point (pH 5.6) with 2 N-sodium hydroxide (0.57 ml.) and the solvent was distilled in vacuo to leave a residue of prednisolone 21-sodium p-methoxyphenyl phosphate (580 mg.) M.P. 195–199° C.

(Found: P, 5.6. $C_{28}H_{34}O_9PNa$ requires P, 5.45%).

EXAMPLE 14

(a) Silver benzyl p-nitrophenyl phosphate

Benzyl di-(p-nitrophenyl) phosphate (2.0 g.) in acetonitrile (25 ml.) was treated with aqueous N-lithium hydroxide (14 ml.) followed by water (14 ml.). The precipitated solid redissolved on stirring for 30 min. at room temperature, and the homogeneous solution was then adjusted to pH 4 by addition of Zeo-Karb 225 ($H^+$ form). The resin was removed by filtration, and the filtrate was concentrated to 20 ml. in vacuo. The solution was extracted with ether until all the p-nitrophenol had been removed from the aqueous layer, and the aqueous layer was combined with water washings of the ether extracts. Part (43 ml.) of the aqueous solution (53 ml.) was warmed and silver nitrate (3.0 g.) was added to precipitate crystalline silver benzyl p-nitrophenyl phosphate (1.05 g.), M.P. 168° C., λmax. (in $H_2O$) 289 mμ, $$E_{1\,cm.}^{1\%} \ 230$$

(b) Prednisolone 21-benzyl p-nitrophenyl phosphate $11\beta:17\alpha$ - dihydroxy-21-iodopregna-1:4-diene - 3:20-dione (3.0 g.) and silver benzyl p-nitrophenyl phosphate (4.5 g.) were boiled under reflux for 5 hr. in acetonitrile (100 ml.). The solvent was removed under reduced pressure, and the residue extracted with chloroform. The chloroform extract was washed with dilute nitric acid, water, aqueous sodium hydrogen carbonate, and water. Removal of solvent from the dried solution left the crude triester (3.2 g.) as a froth.

(c) Prednisolone 21-cyclohexylammonium p-nitrophenyl phosphate

Crude prednisolone 21-benzyl p-nitrophenyl phosphate (3.0 g.) and cyclohexylammonium iodide (6.0 g.) were boiled under reflux for 4 hr. in acetone (150 ml.). The solvent was evaporated in vacuo, and the residue was shaken with water (40 ml.) and ether (100 ml.). The ether layer was decanted from the aqueous suspension, and the aqueous suspension was washed four times with ether. The suspension was extracted with ethyl acetate (3×50 ml.) and the extract was washed with a little water. Removal of solvent from the wet extract left a solid residue (1.34 g.), which could be crystallised from wet ethyl acetate to give prednisolone 21-cyclohexylammonium p-nitrophenyl phosphate M.P. 224° C., (dec.).

(Found: C, 60.0; H, 7.2; N, 4.2; P, 4.9. $C_{33}H_{45}O_{10}N_2P$ requires C, 60.0; H, 6.9; N, 4.3; P, 4.7%), λmax. (in EtOH) 241 mμ, $$E_{1\,cm.}^{1\%} \ 258$$

226 mμ, $$E_{1\,cm.}^{1\%} \ 250$$

λ shoulder 290 mμ, $$E_{1\,cm.}^{1\%} \ 164$$

(d) Prednisolone 21-sodium p-nitrophenyl phosphate

Prednisolone 21-cyclohexylammonium p-nitrophenyl phosphate (200 mg.) in water (3 ml.) and ethanol (12 ml.) was passed through a column of an excess of Zeo-Karb 225 ($H^+$ form), and elution was continued until the eluate was no longer acidic. The eluate was titrated to the equivalence point with 0.1 N sodium hydroxide (3.0 ml.), and evaporation to dryness, finally with benzene, then gave the sodium salt (165 mg.) as a water soluble powder.

EXAMPLE 15

(a) 21-Hydroxypregnane-3:20-dione 21-dibenzyl phosphate 21-iodopregnane-3:20-dione (5.06 g.) and silver dibenzyl phosphate (4.95 g.) were boiled under reflux for 1 hr. in acetonitrile (350 ml.). The solvent was removed under reduced pressure, and the residue was extracted with chloroform. The chloroform extract was washed with aqueous sodium hydrogen carbonate and water, dried over sodium sulphate. Removal of solvent under reduced pressure left the crude 21-dibenzyl phosphate as a gum (6.97 g.).

(b) 21-hydroxypregnane-3:20-dione 21-benzyl hydrogen phosphate

Crude 21-hydroxypregnane - 3:20 - dione 21-dibenzyl phosphate (6.97 g.) and sodium iodide (4.16 g.) were boiled under reflux for 5 hr. 30 mins. in acetone (300 ml.). The solvent was removed under reduced pressure, and the residue was shaken with water (200 ml.). The suspension was extracted with ether (3 x 70 ml.) and the ether extracts were washed with water (50 ml.). The combined aqueous layers were acidified with 2 N-hydrochloric acid to pH 1.5, and extracted with chloroform. The chloroform extract was washed with water and aqueous sodium thiosulphate and then dried over sodium sulphate. Removal of solvent under reduced pressure from the dried solution left 21-hydroxypregnane-3:20-dione 21-benzyl hydrogen phosphate (4.68 g.), as a gum. A similar sample had the required elementary analysis. (Found: C, 66.5; H, 8.35; P, 6.4. $C_{28}H_{39}O_6P$ requires C, 66.9; H, 7.8; P, 6.16%.)

(c) 21-hydroxypregnane-3:20-dione 21-sodium benzyl phosphate

A solution of 21-hydroxypregnane-3:20-dione 21-benzyl hydrogen phosphate (4.68 g.) in methanol (80 ml.) and water (20 ml.) was titrated with 2 N aqueous sodium hydroxide (4.3 ml.) to the equivalence point (pH 7.5). Removal of solvent under reduced pressure then left 21-hydroxypregnane-3:20-dione 21-sodium benzyl phosphate as a froth (4.53 g.), which was obtained from acetone as a hygroscopic white powder, M.P. 143–147° C., $[\alpha]_D^{22}$ +64.6 (c., 0.97 in $H_2O$).

(Found: C, 59.7; H, 7.9; P, 5.8. $C_{28}H_{38}O_6PNa.2H_2O$ requires C, 60.0; H, 7.55; P, 5.5%.)

EXAMPLE 16

(a) Tri-p-cyanobenzyl phosphate p-Cyanobenzyl bromide (13.3 g.) and trisilver phosphate (10 g.) were boiled under reflux for 17 hr. in acetonitrile (80 ml.). After removal of solvent under reduced pressure the residue was extracted with ethyl acetate and the extract was filtered through kieselguhr. The solution was washed with aqueous sodium hydrogen carbonate and then dried. Removal of solvent from the solution left tri-p-cyanobenzyl phosphate (9.1 g.), M.P. 130–132° which after crystallisation from benzene had M.P. 132–134° C., λmax. (in EtOH) 228.5 mμ, $$E_{1\,cm.}^{1\%} \ 1105; \ 236.5 \ m\mu, \ E_{1\,cm.}^{1\%} \ 980; \ 272 \ m\mu, \ E_{1\,cm.}^{1\%} \ 62.5; \ 279 \ m\mu, \ E_{1\,cm.}^{1\%} \ 50.3$$

(b) Di-p-cyanobenzyl hydrogen phosphate

Tri-p-cyanobenzyl phosphate (5 g.) was dissolved in acetonitrile (200 ml.) and boiled under reflux for 6 hr. with sodium iodide (5 g.). The solvent was removed under reduced pressure and the residue mixed with a small quantity of water and extracted with ethyl acetate. Residual ethyl acetate was removed from the aqueous layer and concentrated hydrochloric acid was added. The di-p-cyanobenzyl hydrogen phosphate which separated (3 g.) was washed with a small quantity of water and dried. Recrystallisation from acetone gave the pure sample, M.P. 170–171° C., λmax. (in $H_2O$) 277 mμ, $$E_{1\,cm.}^{1\%} \ 51.5$$

270 mμ, $$E_{1\,cm.}^{1\%} \ 58$$

(c) Silver di-p-cyanobenzyl phosphate

Di-p-cyanobenzyl hydrogen phosphate (2.0 g.) was suspended in water (50 ml.) and titrated to pH 5.5 with 2 N sodium hydroxide. Silver nitrate (1.6 g.) was dissolved in the minimum quantity of water and added to the mixture. The precipitated silver di-p-cyanobenzyl phosphate (2.3 g.) was collected by filtration after 4 hr. and dried over phosphorus pentoxide, M.P. 235–237° C.

(Found: C, 44.6; H, 3.3; N, 6.0; P, 7.4; Ag, 24.6. $C_{16}H_{12}O_4N_2PAg$ requires C, 44.2; H, 2.8; N, 6.4; P, 7.1; Ag, 24.8%.)

(d) *Prednisolone 21-di-p-cyanobenzyl phosphate*

Silver di-p-cyanobenzyl phosphate (1.5 g.) was heated for 1 hr. on the steam bath with 11β:17α-dihydroxy-21-iodopregna-1:4-diene-3:20-dione (1.5 g.) in dimethyl acetamide (50 ml.), when silver iodide separated. The solvent was removed under reduced pressure and the residue was extracted with boiling ethyl acetate (4 x 50 ml.). The extract was filtered through kieselguhr and washed with very dilute ammonia before drying. Removal of the solvent in vacuo left a residue of crude prednisolone 21-di-p-cyanobenzyl phosphate (1.81 g.).

(e) *Prednisolone 21-di-p-cyanobenzyl phosphate*

Prednisolone disilver phosphate (1.3 g.) was boiled under reflux for 16 hr. with p-cyanobenzyl bromide (0.4 g.) in acetonitrile (100 ml.). After this time the reaction was incomplete, unchanged silver salt being present, and a large excess of p-cyanobenzyl bromide (1 g.) was added and refluxing continued for a further 5 hr. The solvent was removed in vacuo and the residue was extracted with boiling ethyl acetate (4 x 100 ml.). The solvent was removed from the extract under reduced pressure and the residue was dissolved in benzene containing some ethyl acetate. Chromatography on magnesium trisilicate gave p-cyanobenzyl bromide (eluted with a 1:3 mixture of ethyl acetatebenzene) and then crude prednisolone di-p-cyanobenzyl phosphate (0.89 g.) (eluted with ethyl acetate).

(f) *Prednisolone 21-cyclohexylammonium p-cyanobenzyl phosphate*

Crude prednisolone 21-di-p-cyanobenzyl phosphate (3.4 g.) was boiled under reflux for 4 hr. with sodium iodide (3.4 g.) in acetonitrile (200 ml.). The deposited sodium salt was collected by filtration of the cooled suspension, washed with acetonitrile (100 ml.), and dried at 60° C./0.1 mm. for 1 hr. A solution of the product (2.16 g.) in water (50 ml.) was extracted with ethyl acetate (50 ml.) and after removal of traces of ethyl acetate from the aqueous layer, cyclohexylamine hydrochloride (2 g.) was added. The oil which separated crystallised from wet ethyl acetate to give prednisolone 21-cyclohexylammonum p-cyanobenzyl phosphate (1 g.), M.P. 216–217° C., $[\alpha]_D$ +84.2° (c., 0.98 in EtOH).

EXAMPLE 17

(a) *o-Carbomethoxyphenyl dibenzyl phosphate*

Dibenzyl phosphite (26 g.) was dissolved in carbon tetrachloride (150 ml.) and to the stirred solution was added sulphuryl chloride (8.3 g.) during 10 minutes at room temperature under nitrogen. A nitrogen stream was passed through the solution for a further 2 hr. and the solvent was then removed in vacuo at near room temperature. The residual oil was added slowly during 30 minutes to a stirred mixture of methyl salicylate (15 g.) and 20% sodium hydroxide solution (200 ml.). The stirring was continued for 1 hr. and the alkaline solution was extracted with benzene (3 x 250 ml.). The extract was dried and solvent removed under reduced pressure to leave o-carbomethoxyphenyl dibenzyl phosphate as an oil (31.6 g.).

(Found: $OCH_3$, 6.8; 7.1. $C_{22}H_{21}O_6P$ requires $OCH_3$, 7.5%.)

(b) *Sodium benzyl o-carbomethoxyphenyl phosphate* o-Carbomethoxyphenyl dibenzyl phosphate (15 g.) was boiled under reflux for 2 hr. with sodium iodide (6 g.) in acetone (250 ml.). The mixture was allowed to cool overnight and the sodium salt (12 g.) was collected by filtration, washed with acetone (250 ml.) and dried at 60° C./0.1 mm. for 1 hr. Recrystallisation from alcohol gave sodium benzyl o-carbomethoxyphenyl phosphate as needles, M.P. 200–205° C.

(Found: $OCH_3$, 8.9. $C_{15}H_{14}O_6PNa$ requires $OCH_3$, 9.0%.)

(c) *Silver benzyl o-carbomethoxyphenyl phosphate*

Sodium o-carbomethoxyphenyl benzyl phosphate (10 g.) in solution in methanol (200 ml.) was passed through a column of Zeo-Karb 225 ($H^+$ form; 150 ml.). The column was washed with methanol (200 ml.) and the combined eluates were shaken with silver carbonate (10 g.) and allowed to stand overnight. The mixture was filtered and the filtrate was concentrated to 10 ml. in vacuo at near room temperature. Addition of ether (250 ml.) gave a crystalline precipitate of silver benzyl o-carbomethoxyphenyl phosphate (6.5 g.), M.P. 120° C.

(Found: Ag, 24.9. $C_{15}H_{14}O_6P.Ag$ requires Ag, 25.2%.)

(d) *Prednisolone 21-benzyl o-carbomethoxyphenyl phosphate*

11β:17α-dihydroxy-21-iodopregna-1:4-diene-3:20-dione (6 g.) was boiled under reflux for 4 hr. with silver benzyl o-carbomethoxyphenyl phosphate (6 g.) in acetonitrile (250 ml.). The solvent was removed under reduced pressure and the residue extracted with boiling ethyl acetate (4×250 ml.) and filtered through kieselguhr. The solvent was removed in vacuo, and the residue was dissolved in chloroform (200 ml.) and shaken with very dilute ammonia, then water, and dried. The solution was poured into a large volume of petroleum ether (B.P. 60–80° C. to precipitate crude prednisolone 21-benzyl o-carbomethoxyphenyl phosphate as a pale yellow powder (7.7 g.). The triester was obtained as an amorphous powder, M.P. 140–142° C., from aqueous alcohol.

(e) *Prednisolone 21-sodium o-carbomethoxyphenyl phosphate*

Prednisolone 21-benzyl o-carbomethoxyphenyl phosphate (4 g.) was boiled under reflux for 2 hr. with sodium iodide (4 g.) in acetone (200 ml.). The mixture was allowed to cool overnight and the crude prednisolone 21-sodium o-carbomethoxyphenyl phosphate (2.45 g.) was collected by filtration, washed with acetone (100 ml.), and dried at 60° C./0.1 mm. for 1 hr.

We claim:

1. A compound selected from the group consisting of hydrocortisone 21-benzyl hydrogen phosphate and non-toxic, water-soluble salts thereof.
2. A compound selected from the group consisting of hydrocortisone 21-(2-hydroxyethyl) hydrogen phosphate and non-toxic, water-soluble salts thereof.
3. A compound selected from the group consisting of hydrocortisone 21-phenyl hydrogen phosphate and non-toxic, water-soluble salts thereof.
4. A compound selected from the group consisting of hydrocortisone 21-ethyl hydrogen phosphate and non-toxic, water-soluble salts thereof.
5. A compound selected from the group consisting of hydrocortisone 21-isopropyl hydrogen phosphate and non-toxic, water-soluble salts thereof.
6. A compound selected from the group consisting of prednisolone 21-benzyl hydrogen phosphate and non-toxic water-soluble salts thereof.
7. A compound selected from the group consisting of prednisolone 21-phenyl hydrogen phosphate and non-toxic, water-soluble salts thereof.

8. A compound selected from the group consisting of prednisolone 21-phenacyl hydrogen phosphate and non-toxic, water-soluble salts thereof.

9. A compound selected from the group consisting of hydrocortisone 21-p-nitrobenzyl hydrogen phosphate and non-toxic, water-soluble salts thereof.

10. A compound selected from the group consisting of prednisolone 21-p-nitrobenzyl hydrogen phosphate and non-toxic, water-soluble salts thereof.

11. A compound selected from the group consisting of prednisolone 21-p-nitrophenyl hydrogen phosphate and non-toxic, water-soluble salts thereof.

12. A compound selected from the group consisting of prednisolone 21-o-methoxyphenyl hydrogen phosphate and non-toxic, water-soluble salts thereof.

13. A compound selected from the group consisting of prednisolone 21-p-methoxyphenyl hydrogen phosphate and non-toxic, water-soluble salts thereof.

14. A compound selected from the group consisting of prednisolone 21-p-bromo-benzyl hydrogen phosphate and its non-toxic, water-soluble salts.

15. A compound selected from the group consisting of prednisolone 21-p-cyanobenzyl hydrogen phosphate and its non-toxic, water-soluble salts.

16. A compound selected from the group consisting of prednisolone 21-o-carbomethoxyphenyl hydrogen phosphate and its non-toxic, water-soluble salts.

17. A compound selected from the group consisting of a compound having the general formula

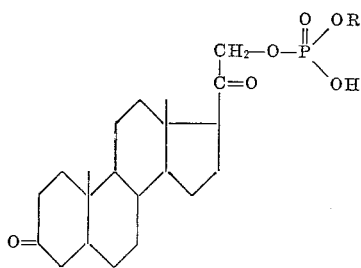

where R is selected from the group consisting of an alkyl group containing 1–6 carbon atoms, a hydroxy-substituted alkyl group containing 1–6 carbon atoms, a benzyl group, a nitro-substituted benzyl group, a bromo-substituted benzyl group, a cyano-substituted benzyl group, a phenyl group, a methoxy-substituted phenyl group, a nitro-substituted phenyl group, a carbomethoxy-substituted phenyl group and a phenacyl group; a compound having the general formula

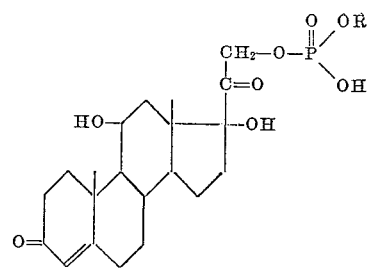

where R has the same meaning as above; the $\Delta^{1,4}$-compound corresponding to said second named compound; and non-toxic water-soluble salts of said saturated and unsaturated compounds.

18. A process for preparing the compounds of claim 17, comprising reacting, in solution in an inert organic solvent, a halide selected from the group consisting of alkali metal and alkaline earth metal halides with a steroid tertiary phosphate otherwise corresponding to said compounds but having at $C_{17}$ the group

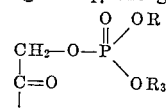

where R has the meaning defined in claim 17 and $R_3$ is a member selected from the group consisting of a benzyl group and a phenacyl group; and separating the desired secondary phosphate after the group $R_3$ has been selectively removed.

19. A process for preparing the compounds of claim 17, comprising hydrolysing a steriod tertiary phosphate otherwise corresponding to said compounds but having at $C_{17}$ the group

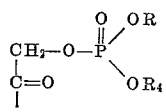

where R has the meaning defined in claim 17 and $R_4$ is a nitro-substituted phenyl group; and separating the desired secondary phosphate after the group $R_4$ has been selectively removed.

References Cited in the file of this patent

UNITED STATES PATENTS

| 2,183,589 | Reichstein et al. | Dec. 19, 1939 |
| 2,779,775 | Sarett | Jan. 29, 1957 |
| 2,789,117 | Sarett | Apr. 16, 1957 |
| 2,837,464 | Nobile | June 3, 1958 |
| 2,870,177 | Conbere | Jan. 20, 1959 |